United States Patent
Binninger et al.

(10) Patent No.: US 11,133,528 B2
(45) Date of Patent: Sep. 28, 2021

(54) ELECTROCHEMICAL ENERGY STORAGE DEVICES WITH SODIUM-ION CONDUCTING SOLID-STATE ELECTROLYTES

(71) Applicant: International Business Machines Corporation, Armonk, NY (US)

(72) Inventors: Tobias Binninger, Zurich (CH); Valery Weber, Gattikon (CH); Teodoro Laino, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 16/292,559

(22) Filed: Mar. 5, 2019

(65) Prior Publication Data

US 2020/0287235 A1 Sep. 10, 2020

(51) Int. Cl.
*H01M 10/0562* (2010.01)
*H01M 10/0585* (2010.01)
*H01M 10/054* (2010.01)

(52) U.S. Cl.
CPC ..... *H01M 10/0562* (2013.01); *H01M 10/054* (2013.01); *H01M 10/0585* (2013.01); *H01M 2300/0071* (2013.01)

(58) Field of Classification Search
CPC .......... H01M 10/0562; H01M 10/054; H01M 10/0585
See application file for complete search history.

(56) References Cited

U.S. PATENT DOCUMENTS 9,431,655 B2  8/2016 Zhao et al.

FOREIGN PATENT DOCUMENTS

CN  106067545 A  11/2016

OTHER PUBLICATIONS

Ahmad A, Wheat TA, Kuriakose AK, Canaday JD, McDonald AG. Dependence of the properties of Nasicons on their composition and processing. Solid State Ionics. Jun. 1, 1987;24(1):89-97.

Shannon, et al., Ionic conductivity in low carnegieite compositions based on NaAlSiO4, Materials Research Bulletin, vol. 14, Issue 3, 1979, pp. 361-367.

Shen et al. Improved electrochemical performance of NaAlO2-coated LiCoO2 for lithium-ion batteries, Journal of Solid State Electrochemistry, Apr. 2017, vol. 21, Issue 4, pp. 1195-1201.

(Continued)

*Primary Examiner* — Helen Oi K Conley
(74) *Attorney, Agent, or Firm* — Daniel Morris; Otterstedt, Wallace & Kammer, LLP

(57) ABSTRACT

Electrochemical energy storage devices are provided comprising an anode, a cathode and a solid-state electrolyte adapted for Na-ion conduction between the anode and cathode. The solid-state electrolyte includes, for example, a solid solution of doped $NaAlO_2$ having a composition defined by one of $D_x(NaAlO_2)_{1-x}$ in which D is at least one of $GeO_2$, $SnO_2$, $TiO_2$, $ZrO_2$ and $HfO_2$, and $D_{x/2}(NaAlO_2)_{1-x}$ in which D is $PAlO_4$, where $0<x\leq0.5$. Other solid-state electrolyte compositions are also disclosed.

8 Claims, 3 Drawing Sheets

(56) References Cited

OTHER PUBLICATIONS

Hayashi, et al. "Superionic glass-ceramic electrolytes for room-temperature rechargeable sodium batteries." Nature commmunications 3 (2012): 856, pp. 1-5, Published May 22, 2012.

Ahmad A, Wheat TA, Kuriakose AK, Canaday JD, McDonald AG. Dependence of the properties of Nasicons on their composition and processing. Solid State Ionics. Jun. 1, 1987;24(1):89-97 (Abstract only pp. 1-2).

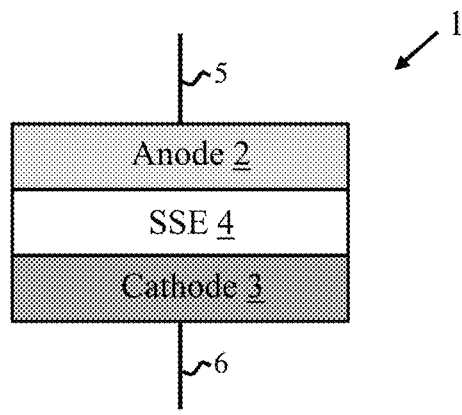
Figure 1
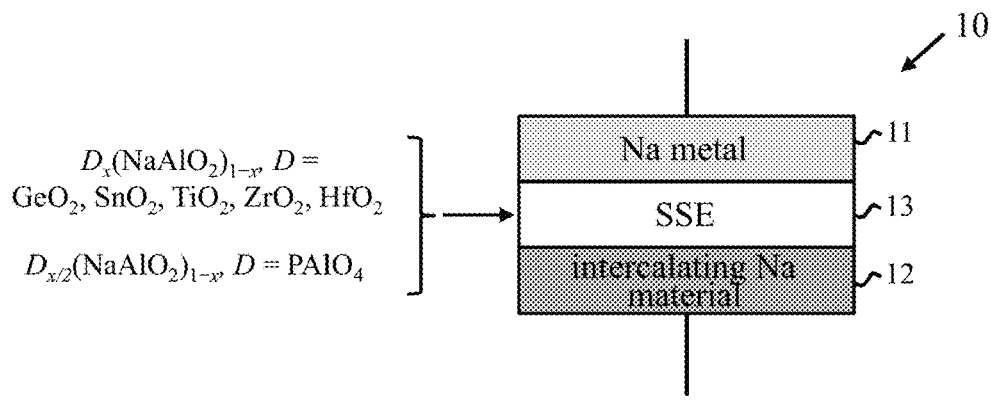
Figure 2
| Compound | Lower Stability Potential Limit (V vs. Na) | Upper Stability Potential Limit (V vs. Na) | Energy Barrier Channel 1 (eV) | Energy Barrier Channel 2 (eV) |
|---|---|---|---|---|
| $(GeO_2)_x(NaAlO_2)_{1-x}$ | +0.415 | +4.012 | 0.280 | 0.409 |
| $(SnO_2)_x(NaAlO_2)_{1-x}$ | +0.986 | +4.012 | 0.332 | 0.445 |
| $(TiO_2)_x(NaAlO_2)_{1-x}$ | +0.202 | +4.012 | 0.266 | 0.395 |
| $(ZrO_2)_x(NaAlO_2)_{1-x}$ | +0.199 | +4.012 | 0.325 | 0.446 |
| $(HfO_2)_x(NaAlO_2)_{1-x}$ | +0.221 | +4.012 | 0.309 | 0.434 |
| $(PAlO_4)_{x/2}(NaAlO_2)_{1-x}$ | +0.243 | +4.012 | 0.555 | 0.386 |
Figure 3

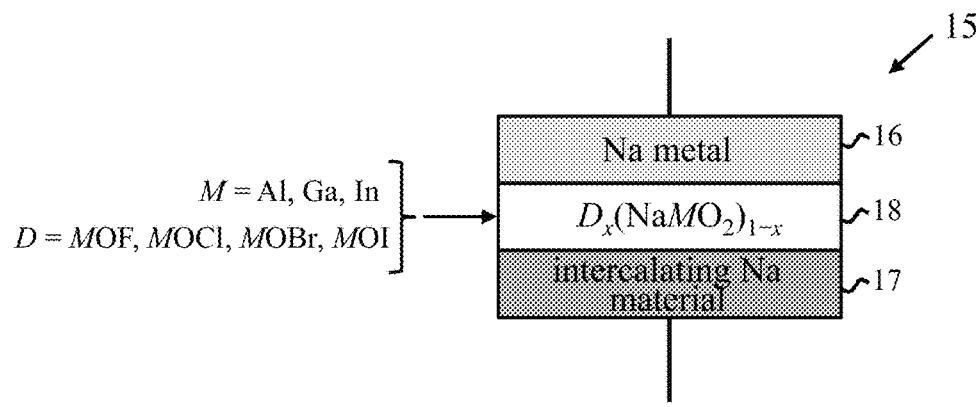

Figure 4

| Compound | Lower Stability Potential Limit (V vs. Na) | Upper Stability Potential Limit (V vs. Na) | Energy Barrier Channel 1 (eV) | Energy Barrier Channel 2 (eV) |
|---|---|---|---|---|
| $(AlOF)_x(NaAlO_2)_{1-x}$ | +0.075 | +4.012 | 0.525 | 0.656 |
| $(AlOCl)_x(NaAlO_2)_{1-x}$ | −0.102 | +4.012 | 0.780 | 0.906 |
| $(AlOBr)_x(NaAlO_2)_{1-x}$ | −0.279 | +4.012 | 0.843 | 1.127 |
| $(AlOI)_x(NaAlO_2)_{1-x}$ | −0.624 | +4.012 | 1.098 | 1.493 |

Figure 5

| Compound | Lower Stability Potential Limit (V vs. Na) | Upper Stability Potential Limit (V vs. Na) | Energy Barrier Channel 1 (eV) | Energy Barrier Channel 2 (eV) |
|---|---|---|---|---|
| $(SiO_2)_x(NaGaO_2)_{1-x}$ | +1.575 | +4.279 | 0.262 | 0.444 |
| $(GeO_2)_x(NaGaO_2)_{1-x}$ | +1.651 | +4.279 | -- | -- |
| $(TiO_2)_x(NaGaO_2)_{1-x}$ | +1.521 | +4.279 | -- | -- |
| $(SiO_2)_x(NaInO_2)_{1-x}$ | +2.768 | +4.380 | 0.482 | 0.669 |

Figure 6

ELECTROCHEMICAL ENERGY STORAGE DEVICES WITH SODIUM-ION CONDUCTING SOLID-STATE ELECTROLYTES

BACKGROUND

The present invention relates generally to electrochemical energy storage devices with sodium-ion conducting solid-state electrolytes.

Solid-state energy storage devices use solid-state electrolytes instead of the liquid electrolytes used in conventional batteries and electrochemical energy cells. These devices have potential to provide safe, compact power sources with small size and high energy capacity. The rise of the Internet of Things (IoT), involving vast arrays of sensors all requiring energy sources, has fueled significant commercial interest in solid-state energy storage devices.

Solid-state electrolytes (SSEs) have been proposed in which conductivity relies on movement of sodium ions through the SSE crystal lattice. Such Na-ion conducting SSEs provide the basis for solid-state sodium batteries such as sodium-ion batteries and sodium-sulfur batteries. NASICON (Na super ionic conductor) is one of the most commonly investigated Na-ion conducting SSE materials. This material suffers from reduced Na-ion conductivities due to $ZrO_2$ side phases commonly resulting from the synthesis procedure (see "Dependence of the properties of Nasicons on their composition and processing", Ahmad et al., Solid State Ionics 24 (1987), 89-97). Another example is BASE (beta-alumina solid electrolyte), β $Al_2O_3$. This material requires elevated temperatures to provide sufficient Na-ion conductivity (see "Superionic glass-ceramic electrolytes for room-temperature rechargeable sodium batteries", Hayashi et al., Nature Communications, 3 (2012), 856). BASE is therefore unsuitable for ambient temperature solid state batteries. Na-ion conduction in carnegieite forms of $NaAlSiO_4$ is discussed in "Ionic conductivity in low carnegieite compositions based on $NaAlSiO_4$", Shannon &. Berzins, Materials Research Bulletin, Volume 14, Issue 3, 1979, pp 361-367. These carnegieites are described as of little practical interest due to their low conductivity levels.

Electrochemical energy storage devices based on other Na-ion conducting SSEs would be highly desirable.

SUMMARY

According to one aspect of the present invention there is provided an electrochemical energy storage device comprising an anode, a cathode and a solid-state electrolyte adapted for Na-ion conduction between the anode and cathode. The solid-state electrolyte comprises a solid solution of doped $NaAlO_2$ having a composition defined by one of $D_x(NaAlO_2)_{1-x}$ in which D is at least one of $GeO_2$, $SnO_2$, $TiO_2$, $ZrO_2$ and $HfO_2$, and $D_{x/2}(NaAlO_2)_{1-x}$ in which D is $PAlO_4$, and wherein $0<x\leq0.5$.

The SSE material in embodiments of the invention thus comprises an $NaAlO_2$ host matrix structure which is doped with dopant D. The parameter x indicates the dopant stoichiometry, i.e. the dopant concentration in terms of the number of units of dopant D expressed as a fraction of the total number of dopant and $NaAlO_2$ units.

Unlike the carnegieite compositions in the Shannon reference above (which are based on carnegieite phase $NaAlSiO_4$ containing Si in the native matrix structure), the native matrix material here is $NaAlO_2$, i.e. so-called β-phase or γ-phase sodium aluminium oxide. For values of x above 0.5, it is expected that a phase transition will occur in the crystal structure of the $NaAlO_2$ matrix. In preferred embodiments, the value of x is sufficiently low that one of the β-phase and γ-phase structure of the $NaAlO_2$ matrix is maintained in the solid solution. While x values equal or close to 0.5 may be sufficiently low in some formulations, in preferred embodiments $x\leq0.3$ and more preferably $\leq0.2$. In particular embodiments discussed below, $x<0.1$.

The doped $NaAlO_2$ solid solutions in embodiments of the invention offer stable, Na-ion conductive SSEs and energy storage devices that are cheaper and easier to produce than alternatives using Na-ion conducting SSE materials such as NASICON or sodium beta-alumina solid electrolytes. The $NaAlO_2$ matrix material is used in various branches of industry and synthesis procedures are well-established. Compared to Na-ion batteries using liquid electrolyte, devices embodying the invention offer enhanced safety through use of a solid-state electrolyte. Compared to lithium-ion batteries, devices embodying the invention benefit from the superior availability and lower cost of sodium compared to lithium.

In some embodiments with composition $D_x(NaAlO_2)_{1-x}$, the dopant D may be only one of $GeO_2$, $SnO_2$, $TiO_2$, $ZrO_2$ and $HfO_2$. In other embodiments here, the dopant D may be a plurality of $GeO_2$, $SnO_2$, $TiO_2$, $ZrO_2$ and $HfO_2$, this plurality being selected to mitigate stress in the crystal lattice of the solid solution due to substitution of dopant ions.

Solid solution SSEs in which D is one of $TiO_2$, $ZrO_2$ and $HfO_2$ offer particularly good properties as discussed below.

A further aspect of the present invention provides an electrochemical energy storage device comprising an anode, a cathode and a solid-state electrolyte adapted for Na-ion conduction between the anode and cathode, wherein the solid-state electrolyte comprises a solid solution of doped $NaMO_2$ having a composition $D_x(NaMO_2)_{1-x}$ where: D is at least one of MOF, MOCl, MOBr and MOI; M is one of Al, Ga and In; and $0<x\leq0.5$. M is Al in preferred embodiments here.

A still further aspect of the present invention provides an electrochemical energy storage device comprising an anode, a cathode and a solid-state electrolyte adapted for Na-ion conduction between the anode and cathode, wherein the solid-state electrolyte comprises a solid solution of doped $NaMO_2$, where M is one of Ga and In, having a composition defined by one of $D_x(NaMO_2)_{1-x}$ in which D is at least one of $SiO_2$, $GeO_2$, $SnO_2$, $TiO_2$, $ZrO_2$ and $HfO_2$, and $D_{x/2}(NaMO_2)_{1-x}$ in which D is $PMO_4$, and wherein $0<x\leq0.5$.

Devices embodying the further aspects of the invention can offer similar advantages to those described above, and the comments on dopant stoichiometry x apply equally here.

Embodiments of the invention will be described in more detail below, by way of illustrative and non-limiting example, with reference to the accompanying drawings.

BRIEF DESCRIPTION OF THE DRAWINGS

FIG. 1 is a schematic representation of structure of an electrochemical energy storage device embodying the invention;

FIG. 2 illustrates a first type of energy storage device embodying the invention;

FIG. 3 indicates properties of SSEs for the FIG. 2 embodiments;

FIG. 4 illustrates a second type of energy storage device embodying the invention;

FIG. 5 indicates properties of SSEs for the FIG. 4 embodiments;

FIG. 6 indicates properties of alternative SSEs for devices embodying the invention.

DETAILED DESCRIPTION

Figure 7A:
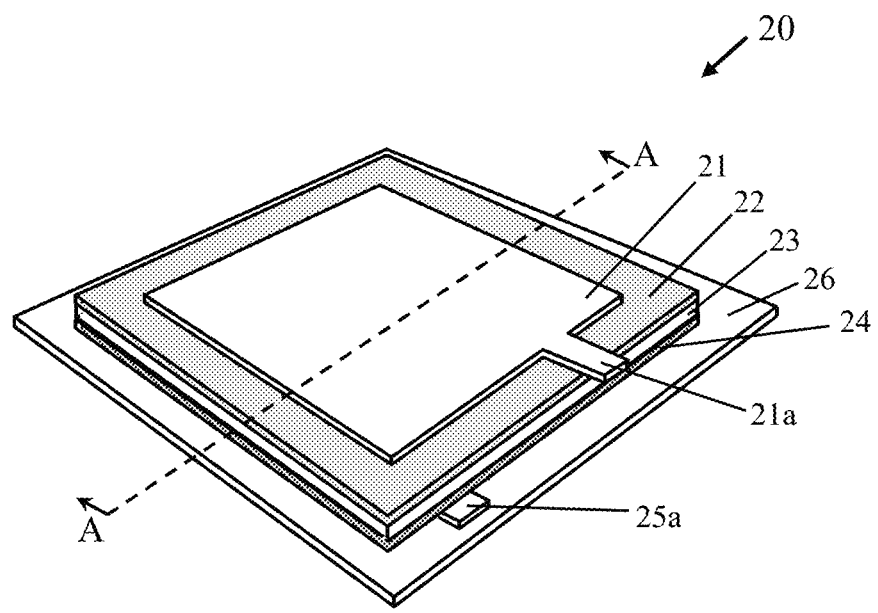
FIGS. 7a and 7b show an exemplary structure of an electrochemical energy cell embodying the invention.

FIG. 1 illustrates the basic structure of an electrochemical energy storage device embodying the invention. The device 1 comprises an anode 2, a cathode 3 and a solid-state electrolyte 4 adapted for Na-ion conduction between the anode and cathode. Electrical contacts, indicated schematically at 5 and 6, are provided for current collection at the anode 2 and cathode 3 respectively. The SSE 4 comprises a solid solution of doped $NaMO_2$ having a composition defined further below. The doped $NaMO_2$ host structure of SSE 4 provides conduction of Na ions as the charge carriers for device operation. Na ions can move between Na-vacancies in the crystal lattice introduced by doping of the host structure. During discharge, oxidation at the anode (by convention the negative device terminal) produces Na ions which migrate through SSE 4 towards the cathode (by convention the positive device terminal). Electrons released by the oxidation process provide current to an external load connected between electrical contacts 5 and 6. A reduction reaction at cathode 3 completes the redox process. The particular reduction reaction here depends on the particular cell type and hence cathode material as discussed further below. During charging, the chemical process is reversed and Na ions migrate back to the anode to recharge the energy cell.

Anode 2 preferably comprises metallic sodium or an intercalating sodium material, although alternatives such as silicon-enhanced anodes may be envisaged. Intercalating sodium materials are materials (typically graphite or other carbon forms) which intercalate sodium, whereby sodium atoms are inserted in the crystal structure of the material. Particularly preferred devices use a sodium metal anode which offers a lighter, more compact structure than the heavier intercalating Na materials.

FIG. 2 indicates the SSE composition in a first set of embodiments. The particular cell structure 10 shown here has a sodium metal anode 11 and a cathode 12 of intercalating sodium material. During discharge, Na ions are reduced at the cathode and taken up (intercalated) by the cathode material. Such a cell 10 may be provided in a solid-state sodium-ion battery. The SSE 13 comprises a solid solution of doped $NaAlO_2$ having a composition defined by one of $D_x(NaAlO_2)_{1-x}$ and $D_{x/2}(NaAlO_2)_{1-x}$. For the composition $D_x(NaAlO_2)_{1-x}$, the dopant D is at least one of $GeO_2$, $SnO_2$, $TiO_2$, $ZrO_2$ and $HfO_2$. For the composition $D_{x/2}(NaAlO_2)_{1-x}$, the dopant D is $PAlO_4$. The dopant stoichiometry for both compositions is defined by $0 < x \leq 0.5$.

In these embodiments, the β-phase or γ-phase $NaAlO_2$ host matrix is converted into a fast Na-ion conducting SSE via cation doping. Dopant ions replace Al cations in the host structure, releasing Na ions at the same time for charge compensation. The displaced Na ions leave vacancies in the host lattice through which Na ions can migrate during cell operation. The native $NaAlO_2$ material can be produced via well-known synthesis procedures. The solid solution is produced by presence of the dopant D during this synthesis process. The dopant stoichiometry x is selected to be sufficiently low that either the β-phase or γ-phase structure of the native $NaAlO_2$ matrix is maintained in the resulting solid solution. Appropriate values for x here may depend, for example, on the particular dopant D. In some embodiments, the β-phase or γ-phase structure may be maintained for x values approaching 0.5, though a phase transition is to be expected beyond this point. In other embodiments, the phase transition may occur at x values between 0.3 and 0.4, and in others at x>0.2. Hence, x≤0.2 is preferred in these embodiments. Particular embodiments detailed below offer good Na-ion conductivity with x≤0.1.

Illustrative Na mobility and stability properties for FIG. 2 embodiments are indicated in FIG. 3. For embodiments with SSE composition $D_x(NaAlO_2)_{1-x}$ here the dopant D is one of $GeO_2$, $SnO_2$, $TiO_2$, $ZrO_2$ and $HfO_2$. This table summarizes potential windows of stability for the different compounds, along with the energy barrier heights for hopping of Na ions through the SSE crystal lattice in each case. The results were obtained via DFT (density functional theory) computations for the various compounds with x=0.03125. The lower stability potential limit corresponds to the reduction potential limit of the SSE and indicates stability versus the anode. The upper stability potential limit corresponds to the oxidation potential limit of the SSE and indicates stability versus the cathode. Thus, the materials are stable for electrode potentials between these two limits, although a wider potential window may be available in practice as explained further below. Potential values are specified with respect to a metallic sodium electrode in each case (in accordance with convention in batteries for reporting potentials with respect to metallic anode potentials). Note also that the upper stability potential limit refers to the oxidation potential of the undoped $NaAlO_2$ host material which is expected to be representative also for the oxidation potential of the doped material. The energy barriers for Channel 1 and Channel 2 indicate the hopping energy barriers for Na ions between adjacent sites along each of the two ion migration channels in the SSE lattice. Na ion mobility increases with lower energy barrier height, and good mobility along both channels provides three-dimensional Na-ion conductivity through the SSE material.

The FIG. 3 results indicate good stability and mobility properties for the various SSEs shown. In particular, lower stability potential limits close to 0V vs. Na suggest good stability properties of the materials against the low potential electrode (Na metal anode in FIG. 2). The upper stability potential limit is good. The low hopping energy barriers at or below about 0.5 eV suggest very good Na mobility properties and fast Na-ion conduction in the doped $NaAlO_2$ structure. Results are particularly good for SSE compounds $D_x(NaAlO_2)_{1-x}$ where D is one of $TiO_2$, $ZrO_2$ and $HfO_2$ which combine the best stability against the anode with low energy barriers for both channels.

Note also that some variation in the operational windows of stability may be expected, due to inherent uncertainties in the generalized gradient approximation calculations and also because batteries can still operate effectively outside the stability window. Some oxidation/reduction of an SSE can occur with minimum hindrance to battery operation, e.g. because decomposition products can provide a passivating effect, which inhibits any further decomposition reaction, while still permitting ionic conductivity.

The above embodiments offer practical and efficient solid-state sodium batteries which are compact, cheap to produce and offer high energy capacity. Such devices have significant potential as safe, portable power sources for IoT sensors.

Various modifications to the above embodiments can be envisaged. For example, an intercalating sodium anode may be employed in some embodiments. In this case, different Na-intercalating matrices are selected for the anode and cathode to provide the different reactivities necessary for battery operation. Also, in some embodiments with SSE composition $D_x(NaAlO_2)_{1-x}$, the dopant may D may be a plurality of $GeO_2$, $SnO_2$, $TiO_2$, $ZrO_2$ and $HfO_2$. This plurality can be selected to mitigate stress in the crystal lattice of the solid solution due to substitution of dopant ions for cations in the host matrix. In particular, if host ions are replaced by dopant ions of different sizes, local stress due to incorporation of the larger dopant ions in the lattice can be reduced. Dopant ions of different sizes can therefore have a volume compensating effect which stabilizes the doped SSE structure.

FIG. 4 indicates the SSE composition in another set of embodiments. As before, the particular cell structure 15 shown here has a sodium metal anode 16 and a cathode 17 of intercalating sodium material. The SSE 18 comprises a solid solution of doped $NaMO_2$ having a composition $D_x(NaMO_2)_{1-x}$ where: D is at least one of MOF, MOCl, MOBr and MOI; M is one of Al, Ga and In; and $0<x\leq0.5$. In these embodiments, the β-phase or γ-phase $NaMO_2$ host matrix is converted into a fast Na-ion conducting SSE via anion doping. Dopant F, Cl, Br or I ions replace oxygen anions in the host structure, releasing Na ions which leave vacancies in the host lattice for Na ion migration. The previous comments on preferred values of x apply equally to these embodiments.

Illustrative Na mobility and stability properties for FIG. 4 embodiments are indicated in FIG. 5, where M is Al and D is one of AlOF, AlOCl, AlOBr and AlOI. This table summarizes stability and mobility properties for the various compounds with x=0.03125 as before. Excellent lower stability potential limits are obtained with all dopants. The negative lower potential limits of the Cl-doped, Br-doped, and I-doped SSEs indicate true thermodynamic stability versus Na metal. The best mobility results are obtained with D being MOF or MOCl, though the other dopants may offer sufficient conductivity for some embodiments.

Comparable results may be expected with M=Ga or In in the FIG. 4 structure, though lower stability limits are expected to be higher as demonstrated for other embodiments described below. Due to tolerances in stability windows as explained above, such embodiments may provide adequate stability for some device implementations. Other modifications here include alternative anode materials, and dopant combinations to mitigate stress in the crystal lattice, as described above for the FIG. 2 embodiments.

In a further set of embodiments, the SSE 4 of the energy storage device has a similar composition to the FIG. 2 embodiments with Al replaced by Ga or In. In particular, the SSE 4 comprises a solid solution of doped $NaMO_2$, where M is one of Ga and In, having a composition defined by one of $D_x(NaMO_2)_{1-x}$ and $D_{x/2}(NaMO_2)_{1-x}$. For the composition $D_x(NaMO_2)_{1-x}$, the dopant D is at least one of $SiO_2$, $GeO_2$, $SnO_2$, $TiO_2$, $ZrO_2$ and $HfO_2$. For the composition $D_{x/2}(NaMO_2)_{1-x}$, the dopant D is $PMO_4$. Again here $0<x\leq0.5$, with preferred values of x as described for earlier embodiments. FIG. 6 shows mobility and stability results for illustrative embodiments here with composition $D_x(NaMO_2)_{1-x}$ where D is one of $SiO_2$, $GeO_2$, and $TiO_2$. Upper stability potential limits (again defined for the undoped host material) are higher than embodiments with M=Al, as are the lower stability limits, though workable stability ranges may be achievable due to tolerances described above. The low energy barriers for $(SiO_2)_x(NaGaO_2)_{1-x}$ indicate good mobility, and comparable results may be expected for the other $D_x(NaGaO_2)_{1-x}$ and $D_{x/2}$ $(NaGaO_2)_{1-x}$ compounds of this set following the general trends indicated in FIG. 3 for the Al-based compounds. The result for $(SiO_2)_x(NaInO_2)_{1-x}$ indicates lower, though reasonable Na-ion mobility, with a stability window shifted towards more positive voltages. Results for other $D_x(NaInO_2)_{1-x}$ and $D_{x/2}(NaInO_2)_{1-x}$ compounds of this set may be expected to follow the general trends indicated in FIG. 3 for Al-based compounds.

Energy cells embodying the invention may be fabricated with various form factors using generally-known material processing techniques. One example of an energy cell structure is shown in elevation in FIG. 7a. FIG. 7b is a cross-sectional view on line A-A of FIG. 7a. The cell 20 comprises a series of material layers comprising an anode contact layer 21, anode material layer 22, SSE layer 23, cathode layer 24 and cathode contact layer 25 overlaid as shown on a substrate 26. The anode and cathode contact layers 21 and 25 may be formed, for example, of copper or aluminium. These layers 21, 25 include contact tabs 21a and 25a respectively for connecting the cell to external circuitry.

Figure 7B:
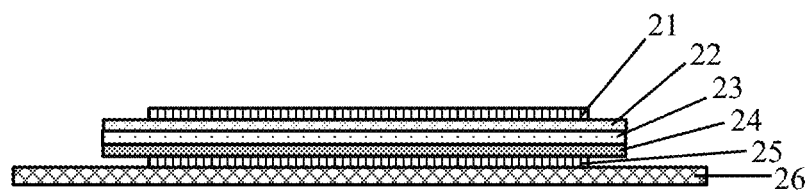

The different material layers may have different thicknesses (not shown to scale in FIGS. 7a and 7b). Layer thickness may typically be about a few hundred micrometres, or even less. Lateral cell dimensions may be of the order of a centimetre, or even less. While a generally planar cell structure is shown, numerous other cell designs can be envisaged. For example, the overlaid layers may be curved, folded, rolled or otherwise formed into any convenient cell shape. The cell 20 may also include other material layers, e.g. insulating/encapsulating layers, as appropriate.

A solid-state sodium battery embodying the invention may in general comprise one or more energy cells as described above. Battery units may also include additional components such as sensors, e.g. temperature sensors, and thermal management modules or other monitoring/battery management components.

Various other changes and modifications can of course be made to the exemplary embodiments described. For example, while the cathode comprises an intercalating sodium material for the Na-ion battery cells described above, other cathode materials may be used in other solid-state sodium batteries employing different reactions at the cathode. For example, the cathode may comprise sulfur in a sodium-sulfur battery. As another example, in a sodium-air battery the cathode may comprise a porous material such as porous carbon which is exposed to air in the battery unit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electrochemical energy storage device comprising:
   an anode,
   a cathode and
   a solid-state electrolyte adapted for Na-ion conduction between the anode and cathode,
   wherein the solid-state electrolyte comprises a solid solution of doped $NaAlO_2$ having a composition defined by one of $D_x(NaAlO_2)_{1-x}$ in which D is at least one of $GeO_2$, $SnO_2$, $TiO_2$, $ZrO_2$ and $HfO_2$, and $D_{x/2}(NaAlO_2)_{1-x}$ in which D is $PAlO_4$, and wherein $0<x\leq0.5$.

2. The device as claimed in claim 1 wherein x is such that one of the β-phase and γ-phase structure of the $NaAlO_2$ is maintained in said solid solution.

3. The device as claimed in claim 1 wherein $x\leq0.2$.

4. The device as claimed in claim 1 wherein said composition is $D_x(NaAlO_2)_{1-x}$ and D is one of $GeO_2$, $SnO_2$, $TiO_2$, $ZrO_2$ and $HfO_2$.

5. The device as claimed in claim 4 wherein D is one of $TiO_2$, $ZrO_2$ and $HfO_2$.

6. The device as claimed in claim 1 wherein said composition is $D_x(NaAlO_2)_{1-x}$ and D is a plurality of $GeO_2$, $SnO_2$, $TiO_2$, $ZrO_2$ and $HfO_2$, said plurality being selected to mitigate stress in the crystal lattice of the solid solution due to substitution of dopant ions.

7. The device as claimed in claim 1 wherein said anode comprises one of metallic sodium and an intercalating sodium material.

8. The device as claimed in claim 7 provided in a solid-state sodium-ion battery wherein said cathode comprises an intercalating sodium material.

\* \* \* \* \*